US005867584A

United States Patent [19]

Hu et al.

[11] Patent Number: 5,867,584
[45] Date of Patent: Feb. 2, 1999

[54] VIDEO OBJECT TRACKING METHOD FOR INTERACTIVE MULTIMEDIA APPLICATIONS

[75] Inventors: Xiaoping Hu, San Jose; Jun Takamura, Los Altos Hills; Mark Hall, San Francisco, all of Calif.

[73] Assignee: NEC Corporation, Tokyo, Japan

[21] Appl. No.: 605,536

[22] Filed: Feb. 22, 1996

[51] Int. Cl.$^6$ .............................. G06K 9/00; H04N 5/33
[52] U.S. Cl. ..................... 382/103; 382/107; 382/218; 348/169
[58] Field of Search .................................. 382/103, 107, 382/173, 218; 348/169

[56] References Cited

U.S. PATENT DOCUMENTS

| | | | |
|---|---|---|---|
| 4,868,871 | 9/1989 | Watson, III | 382/103 |
| 5,243,418 | 9/1993 | Kuno et al. | 382/103 |

OTHER PUBLICATIONS

X. Hu and N. Ahuja, "Feature Extraction and Matching As Signal Detection", International Journal of Pattern Recognition and Artificial Intelligence, vol. 8, No. 6 (1994) pp. 1343–1379.

X. Hu and N. Ahuja, "Motion and Structure Estimation Using Long Sequence Motion Models" Image and Vision Computing, vol. 11, No. 9, Nov. 1993, pp. 549–570.

X. Hu, "Perception of Shape and Motion", Ph.D. Dissertation, University of Illinois at Urbana–Champaign, 1993.

*Primary Examiner*—Jose L. Couso
*Assistant Examiner*—Matthew C. Bella
*Attorney, Agent, or Firm*—Skjerven, Morrill, MacPherson, Franklin & Friel LLP; Alan H. MacPherson; Gary J. Edwards

[57] ABSTRACT

A system for automatically tracking objects through a video sequence uses a method which automatically tracks an object by estimating the location of the object in a subsequent frame, comparing test windows in the subsequent frame with an object window encompassing the object in the original frame, and selecting the best match window which is most similar to the object window. The location of the best match window corresponds to the location of the object in each frame of the video sequence. The resulting location information can be combined with the video sequence to create interactive video applications in which an user of the application can select individual objects in the interactive video sequence.

4 Claims, 6 Drawing Sheets

VIDEO OBJECT TRACKING METHOD FOR INTERACTIVE MULTIMEDIA APPLICATIONS

BACKGROUND OF THE INVENTION

1. Field of the Invention

This invention relates to the tracking of objects in the frames of a video sequence for interactive multimedia applications, interactive television, and games, for example.

2. Description of the Related Art

As computers have improved in processing power, display capability, and storage capacity, computer applications incorporating video sequences have become commonplace. One important feature for the success of these "video applications" is for a user to interact with objects in the video sequence.

For example, an educational program about marine life can incorporate a video sequence of marine life to more vividly display the various creatures of the ocean. Ideally, the program is interactive so that, when a child using a pointer on the screen selects a particular creature, the computer either states the scientific name and a short description of the creature or displays information about the creature on the screen. The computer must correlate the location of the pointer on the screen with the location of the creatures in the image to determine which creature was selected. If the video sequence is generated by the computer, then the computer should know the location of each creature. However, for realism an actual video sequence of real ocean creatures should be digitized and displayed by the computer. In this case, the computer is only given a series of images and will not know the location of each creature within the image. Consequently, a separate data structure must be created containing the location of each creature in each frame of the video sequence in order for the computer to correlate the location of the pointer to the location of the creatures to determine which creature was selected. In other programs, the location of other objects must be tracked much as the location of the ocean creatures are tracked. Typically, the interactive video application will combine the original video sequence and the location information into an interactive video sequence on a computer readable medium, such as CD-ROMS, magnetic disks, or magnetic tapes.

The advances in computing have been transplanted into the video industry in the form of microprocessor controlled "set-top boxes" for applications such as interactive television with video on demand systems. In an interactive television system, it is desirable to allow the user to select objects on the television screen and receive information regarding that object. For example, a customer may request a video about Pro Football's greatest games which will contain various video sequences of significant games. A customer will derive greater enjoyment from the video if he is able to select players using a pointer on the screen to receive additional information on the screen about the selected player. For example, the customer may be interested in the player's game statistics or career statistics. In order to determine which player has been selected, the microprocessor must be able to correlate the location of the pointer to the location of the players. Therefore, each player image must be tracked as a separate object throughout the video sequence. Furthermore, the microprocessor must receive the object data as well as the desired information about the players at the same time the video is sent to the set-top box. The interactive video sequence combining the original video and the location information can be sent to the set-top box using various transmission lines, such as co-axial cable, phone lines, or fiber-optic cabling. Alternatively, the interactive video sequence can be broadcast to the set-top boxes over the airwaves.

Unless the processor knows the location of all objects in the video sequence, the processor will be unable to discern which object the user wishes to select. Consequently, in order to provide interactive television or interactive video applications, the location of each object in each frame of the original video sequence must be tracked for the processor.

Typically, object locations are generated by having an operator manually mark objects on a computer display for each frame of the video sequence. For the marine life video the operator would first identify a particular creature to be tracked. The operator would then use a mouse or other user interface hardware to draw a rectangle around the creature on every frame of the image. The computer then stores the information on that creature for that frame. Once the operator finishes marking the frame, he must proceed to the next frame. This continues for each frame of the video sequence and for each creature on the video sequence. Alternatively, the operator can mark and label every creature on each frame before proceeding to the next frame.

Full motion video currently uses thirty frames per second so for even one minute of video 1800 frames of video are generated. Therefore it is extremely inefficient and tedious to track the objects manually. Since the objects will probably not move far between frames, some conventional systems attempt to estimate the motion of tracked objects using interpolation. For example an operator may manually track an object once for every second of the video sequence. The system then estimates the location of the object in the frames between the manually tracked frames by linear interpolation using the position of the object in the manually tracked frames. This method can produce reliable results for objects which exhibit linear motion; however, for non linearly moving objects this method is very inaccurate.

Hence there is a need for a method or system to automatically and accurately track an object through a video sequence more rapidly, more accurately, and more efficiently than conventional methods.

SUMMARY OF THE INVENTION

In accordance with this invention, the objects within a video sequence are tracked throughout the video sequence. Instead of requiring a user to manually track the objects through each frame of the video sequence, the present invention will automatically track any specified object in the video sequence.

Specifically, in one embodiment the system accepts a specified object window enveloping the object to be tracked in a first frame. The system then estimates the position of the object in a second frame based on the position of the object in a selected number of previous frames. Next, all possible test windows, which may contain the object, within a predetermined distance from the estimated position are compared with the object window. The system then selects the best match window, i.e. the window most similar to the object window, from the test windows.

The automatic tracking method can use various measures to determine which test window is most similar to the object window. For example, in one embodiment the method may incorporate edge detection with chamfer distance calculations, in which the test window with the lowest chamfer distance is the best match window. In another embodiment, intensity distance is used. Tracking quality can be controlled by setting thresholds for the similarity measures.

The system can be enhanced through the use of a graphical user interface (GUI). The user may initialize the image object of interest by drawing an object window that envelopes the object. A monitor window is provided so that the user can monitor the tracking progress. The user may stop or restart an object tracking process if the user desires.

DETAILED DESCRIPTION

According to the principles of this invention, the inefficiencies imposed by manual tracking of objects have been overcome. The present invention automatically tracks one or more objects through a video sequence. For example, in one embodiment of the invention, after the user specifies an object in one frame of the video, the invention will automatically track the object in subsequent frames until the tracking quality falls below a predetermined threshold. Therefore, the present invention eliminates the need for a user to manually track an object through every frame of the video sequence.

Figure 1:
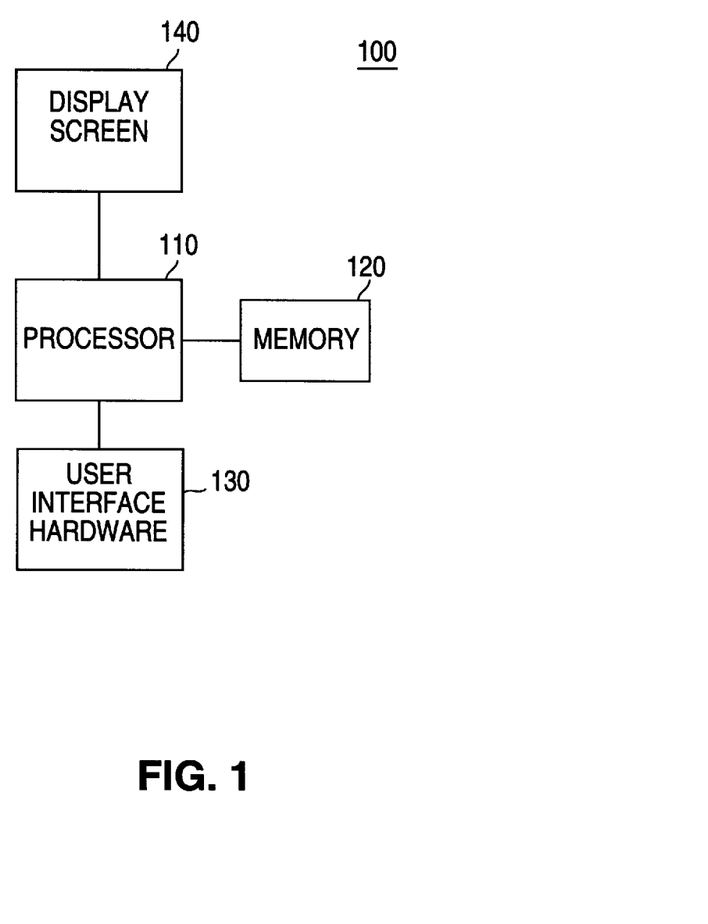
FIG. 1 shows a computer system which can be used to implement an object tracking system in accordance with the present invention.

FIG. 1 shows computer system 100 which can implement the invention. Computer system 100 has processor 110 coupled to memory 120, user interface hardware 130, and display screen 140. User interface hardware 130 is typically a keyboard and a mouse. However, other user interface hardware such as joysticks, trackballs, light pens, or any other appropriate interface mechanism can also be used. Display screen 140 provides a graphical user interface (GUI) for the user. Computer system 100 can be implemented using various computer systems such as workstations or IBM compatible personal computers.

Figure 2:
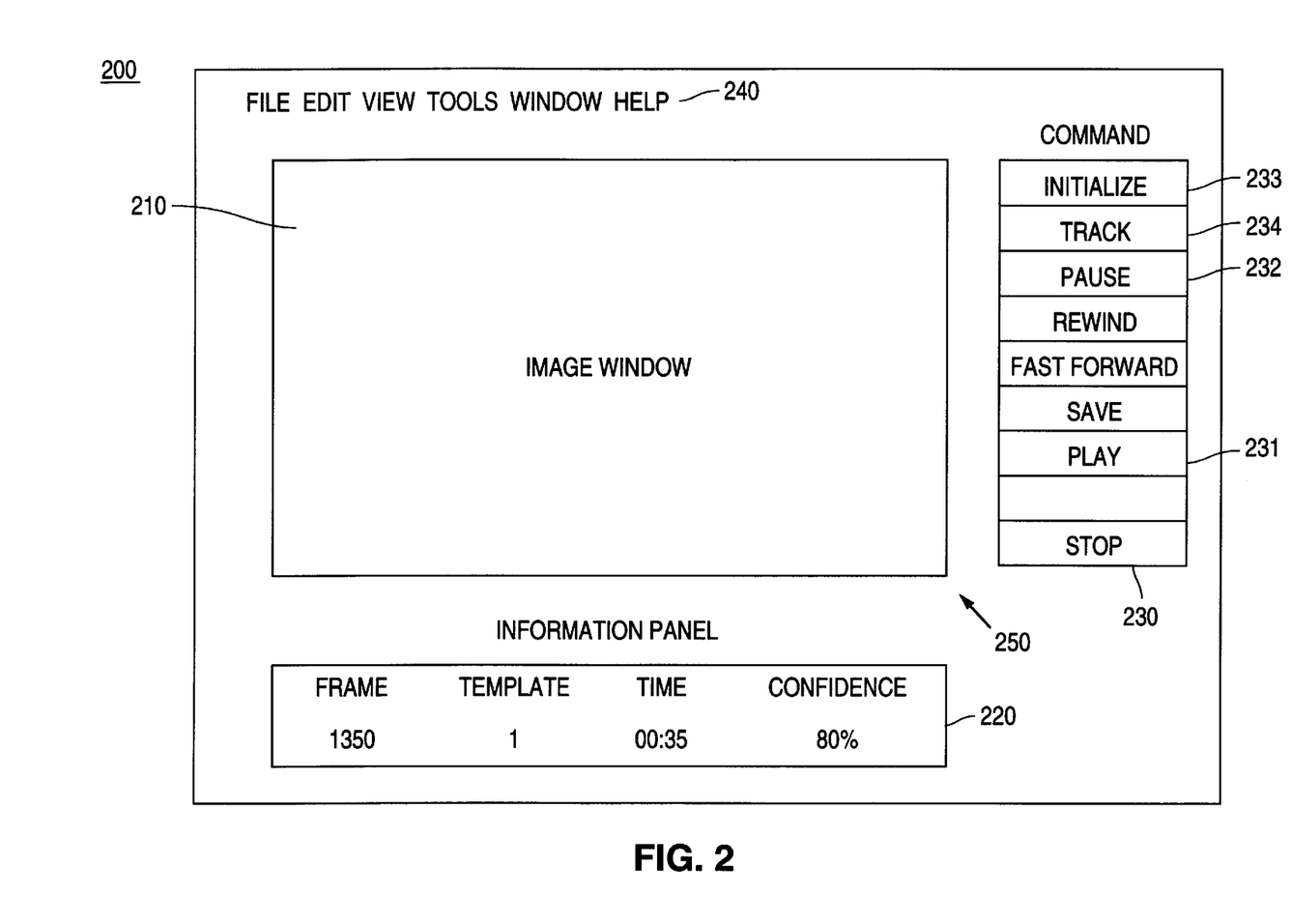
FIG. 2 shows a graphical user interface which can be used with an object tracking system in accordance with the present invention.

FIG. 2 is an example of GUI 200 which can be used with the present invention. Frames of the video sequence are displayed in image window 210. Information regarding the specific frame in image window 210 is displayed in information panel 220. For example, in the particular embodiment of FIG. 2, information panel 220 displays the frame number of the frame in image window 210, the template number used for matching, the length of time of the video sequence already processed, as well of the confidence level of the current match. Command panel 230 provides various control buttons to control the system. Menu bar 240 provides additional commands for the system. The user can select the various commands using pointer 250 which is controlled by the hardware user interface 130.

A typical object tracking session begins when the user opens a video file. The user then selects play button 231 to watch the video sequence. Once the user sees an object he or she wishes to track, the user selects Pause button 232 to pause the video sequence. The user then selects Initialize button 233 to begin the tracking process. The user then uses pointer 250 to define the object window around the object so that the object window envelopes the object. The object window can be any arbitrary shape; however, a rectangular window is typically used. The user then selects Track button 234, which instructs the system to automatically track the object in subsequent frames. The system will display each frame of the video sequence in image window 210 as it is processed so that the user can interrupt the process or re-initialize the process if he desires. If the system fails to track the object in a frame the system will warn the user and wait for further instructions from the user. Alternatively, a user can set a very low matching threshold to allow the system to automatically track the object while the user monitors the results in image window 210. If the low threshold tracking becomes inaccurate the user can then manually interrupt the automatic tracking to reinitialize the tracking at the point the automatic tracking became inaccurate by respecifying the object window.

Depending on the particular embodiment of the invention used, other warning messages may also be displayed. For example, in one embodiment the system can replace the original object window with a replacement window if certain conditions (to be described in detail below) are met. Furthermore, the system can track multiple objects simultaneously if the user selects multiple objects during the initialization phase of the process.

Figure 3:
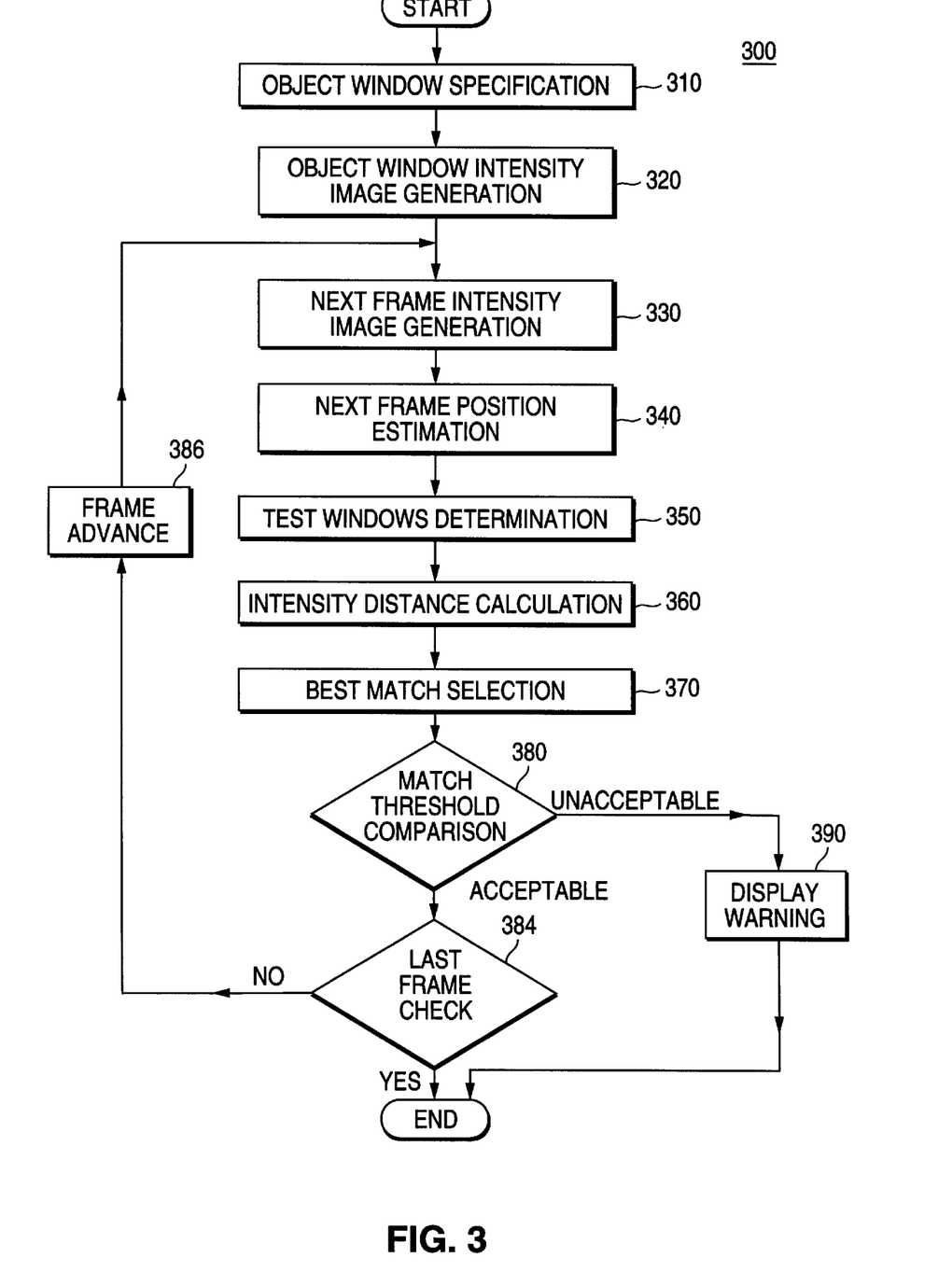
FIG. 3 shows a process flow diagram of an implementation of the object tracking system in accordance with the present invention using intensity distance.

FIG. 3 shows a process flow diagram for automatically tracking objects in a video sequence. In object window specification 310, the area around the object to be tracked is specified as an object window. The object window can be any arbitrary shape. An object window in the same shape as the object is likely to lead to more accurate tracking; however, a rectangular window can be processed more rapidly without significantly reducing accuracy. A compromise can be achieved between a rectangular window and a window shaped like the object by using a window in the shape of a polygon or a circle which is similar to the shape of the object. In accordance with this invention, a window of any appropriate shape can be used. In some embodiments of the invention, the initial object window is specified by the system. For example, for the marine video, the system can be programmed to find a particular type of marine creature for the initial object window based on previous images of that creature. After specification of the object window is complete, processing is transferred to object window intensity image generation 320.

Object window intensity image generation 320, generates an intensity image of the object window. For gray scale images the intensity image is simply the grayscale value of each picture element (pixel) of the window. Color images can be converted to grayscale images to derive the intensity image. However, better results are obtained by using an intensity image for each color component of the object window. Therefore, the system will generate a red intensity image, a green intensity image, and a blue intensity image for a color image. The exact method used to convert the video sequence into intensity images is conventional and depends on the format used for creation and storage of the video sequence.

Processing then transfers to next frame intensity image generation 330, where the next frame of the video sequence is converted into an intensity image.

Then, in next frame position estimation 340, the system estimates the location of the object in the next frame based on the center of the object in the previous frames. The number of previous frames used in the estimation will depend on the particular estimation method used. In one embodiment of the invention, an estimation method using a least square fit of a quadratic polynomial is used to estimate the location of the object in the next frame. Specifically, this embodiment attempts to estimate $C_{N+1}$, the center of the object in frame number N+1, where $C_{N+1}$ is a vector $[X_{N+1}, Y_{N+1}]$ using the equation:

$$C_{N+1} = i * (N+1)^2 + j * (N+1) + k, \quad (1)$$

where i, j, and k are also two dimensional vectors to be determined using equation (4). The horizontal coordinate and the vertical coordinate of the center are calculated independently. Therefore, equation (1) can be thought of as two independent equations:

$$X_{N+1} = i_x * (N+1)^2 + j_x * (N+1) + k_x, \quad (2)$$

and $$Y_{N+1} = i_y * (N+1)^2 + j_y * (N+1) + k_y; \quad (3)$$

however, the two-dimensional form in equation (1) will be used for conciseness.

The values of i, j, and k are estimated by finding the i, j, and k which minimizes the following equation:

$$\sum_{d=1}^{N} \|C_d - (i * d^2 + j * d + k)\|^2 \quad (4)$$

where $C_d$ is the center of the object window of frame number d. Well known methods are used to solve equation (4). When N is less than three, there are not enough data points to solve equation (4) accurately. Therefore, when N is less than three a linear estimate is used instead of the quadratic polynomial. Specifically, the value of i is set to zero and the values of j and k are estimated. After estimating the center of the object in the next frame, processing passes to test windows determination 350.

In test window determination 350, the system will create a set of test windows in the next frame. The set of test windows is composed of every possible window of the same size and shape as the object window having a center pixel less than a predefined distance from the estimated center point. Once the set of test windows is determined, processing is transferred to intensity distance calculation 360.

Within intensity distance calculation 360, the intensity distance between the object window and each test window is calculated. Specifically, for a specific test window, T, the system generates an intensity distance window, $ID_T(x,y)$, of the same size and shape as the object window and test windows, by subtracting the intensity of each pixel in the test window, T, from the intensity of the corresponding pixel in the object window. Then the system calculates an average intensity distance, $A_T$, for test window T by averaging the distance value of every distance in the intensity distance window, $ID_T(x,y)$. Finally the system calculates the intensity distance $ID_T$ for test window T by summing the absolute values of the difference between each distance in distance window, $ID_T(x,y)$, and the average distance $A_T$. Calculation of the intensity distance is summarized by the following equations:

$$ID_T(x,y) = OW(x,y) - T(x,y) \quad (5)$$

$$A_T = \frac{1}{M} \Sigma(ID_T(x, y)) \quad (6)$$

$$ID_T = \Sigma |ID_T(x, y) - A_T| \quad (7)$$

where OW(x,y) is the intensity image of the object window, M is the number of pixels in the object window, and the summations are across all M pixels.

As stated above, for color images better results are obtained by calculating an intensity image for each color component. To determine the intensity distance between a color object window intensity image and a color test window, an intensity distance for each color component is calculated. The intensity distance of the specific test window is then set to the maximum of the intensity distances of the color components.

After the intensity distance for each test window is calculated, the system selects the test window with the lowest intensity distance as the best match window in best match selection 370. Processing then passes to match threshold comparison 380.

In match threshold comparison 380, the intensity distance of the best match window is compared to a predetermined match threshold. If the intensity distance of the best match window is less than the predetermined threshold, the tracking is acceptable and processing is passed to last frame check 384. If the last frame is reached the system ends and awaits further commands from the user. Otherwise, the system advances to the next frame in frame advance 386. Since most objects will not travel very far in each frame, the system can obtain reliable results even if only a subset of the frames of the video sequence is processed. Therefore, some embodiments of the invention will advance several frames in frame advance 386. Then processing passes to next frame intensity image generation 330 and the next frame of the video sequence will be processed in the manner just described. However, if the intensity distance of the best match window is greater than the match threshold, processing passes to display warning 390, where the system displays a warning on GUI 200 (FIG. 2) and awaits further commands from the user.

Figure 4:
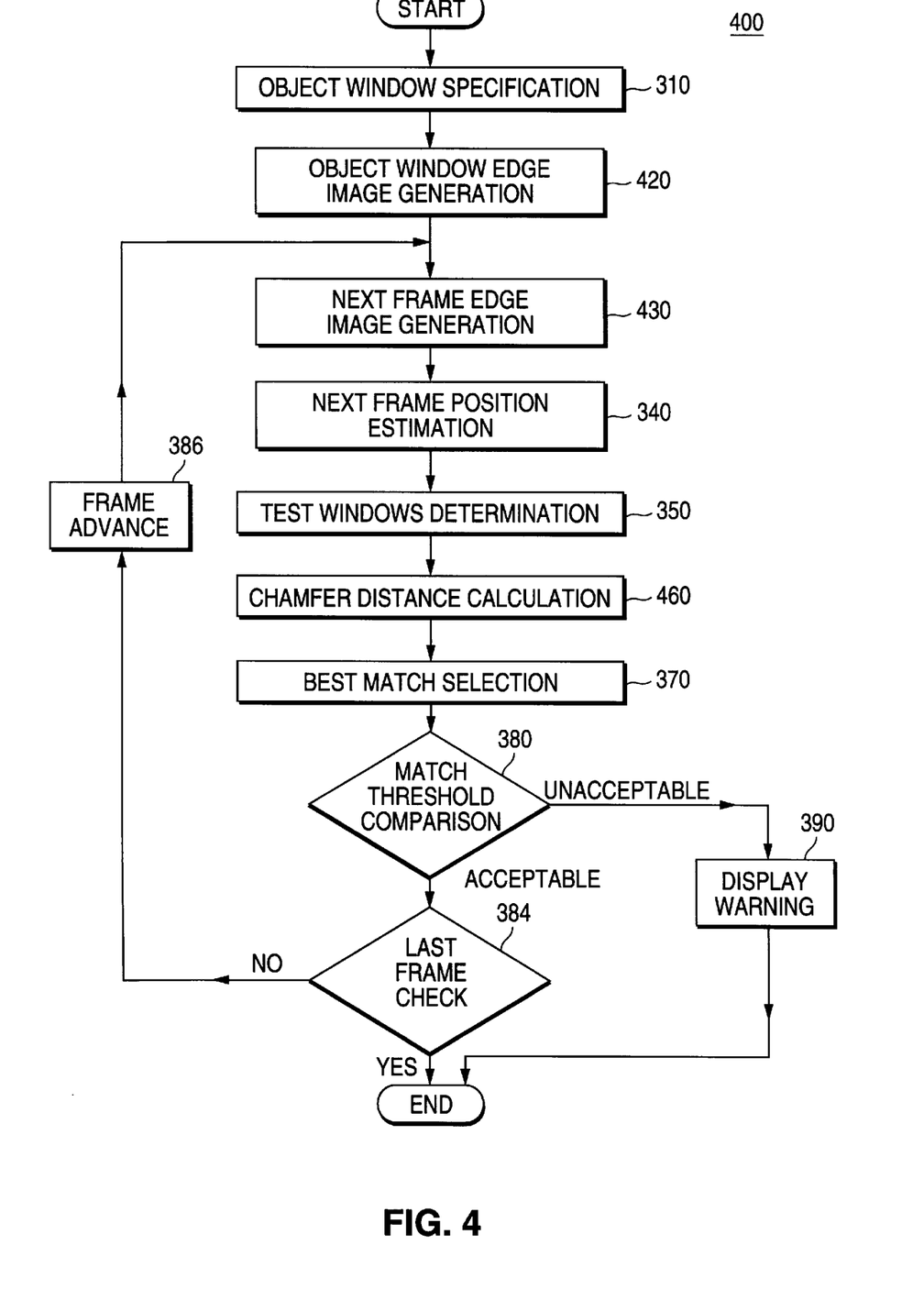
FIG. 4 shows a process flow diagram of an implementation of the object tracking system in accordance with the present invention using chamfer distance.

FIG. 4 shows a process flow diagram of a second embodiment 400 of the invention. This embodiment is similar to that illustrated in FIG. 3. Consequently, the complete description is not repeated. Rather, only the modifications to the structures and operations in FIG. 3 are described. In the second embodiment the chamfer distance between edge images are used in place of the intensity distance between intensity images. A chamfer distance between two edge images is calculated by averaging the distance of each edge pixel on the first edge image to the closest edge pixel in the second image. Specifically, in FIG. 4, object window intensity image generation 320 is replaced with object window edge image generation 420; next frame intensity image generation 330 is replaced with next frame edge image generation 430; and intensity distance calculation 360 is replaced with chamfer distance calculation 460.

In object window edge image generation 420, an edge detection method is used to create an edge image of the object window. The edge detection method extracts the skeletal structure of the object by finding the edges of the object in the image. Any reasonably good edge detection method can be used with the present invention. A specific method of edge detection suitable for use in connection with the present invention is shown on pages 1355–1357 of Hu, et al., "Feature extraction and Matching as Signal Detection", *International Journal of Pattern Recognition and Artificial Intelligence*, Vol. 8, No. 6, 1994, pp. 1343–1379." the disclosure of which is hereby incorporated by reference.

In next frame edge image generation 430, an edge detection method is used to create an edge image of the next frame of the video sequence. As with object window edge image generation 420, any reasonable edge detection method can be used. However, for more consistent results object window edge image generation 420 and next frame edge image generation 430 should use the same edge detection method.

In chamfer distance calculation 460, the system calculates the chamfer distance between the object window edge image and each test window, as determined in test window determination 350. A chamfer distance between two edge images is calculated by averaging the distance of each edge pixel on the first edge image to the closest edge pixel in the second image. Any chamfer distance calculation method can be used with the present invention. A specific method of chamfer distance calculation suitable for use in connection with the present invention is shown on pages 1360–1362 of the above-described article by Hu, et al.

Best match selection 370 and match threshold comparison 380 are functionally identical in the embodiments of FIG. 3 and FIG. 4. However, in the embodiment of FIG. 3, the distances and match threshold are intensity distances while in the embodiment of FIG. 4, the distances and match threshold are chamfer distances.

Figure 5:
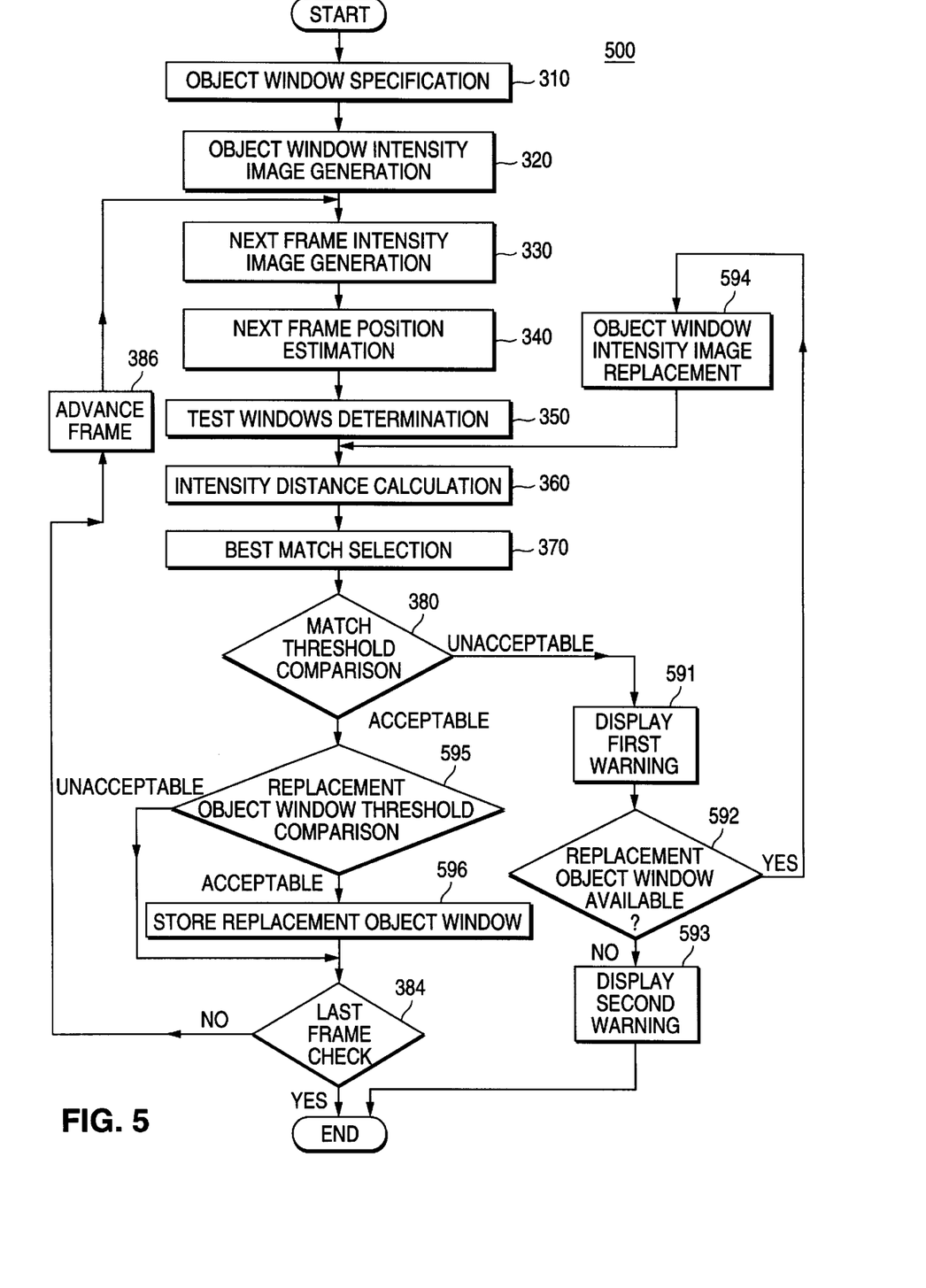
FIG. 5 shows a process flow diagram of an implementation of the object tracking system in accordance with the present invention using intensity distance and object window replacement.

FIG. 5 shows a process flow diagram of another embodiment of the present invention. This embodiment is similar to that illustrated in FIG. 3. Consequently, the complete description is not repeated. Rather, only the modifications shown in FIG. 5 to the structures and operations in FIG. 3 are described. The embodiment of FIG. 5 improves the embodiment of FIG. 3 by allowing the system to automatically replace the object window with a best match window from a previous frame. The embodiment of FIG. 5 functions identically with the embodiment of FIG. 3 until after match threshold comparison 380. If the best match window is acceptable, processing passes to replacement object window threshold comparison 595, where the distance of the best match window is compared to a replacement object window threshold. If the distance of the best match window is greater than the replacement object window threshold, the best match window is an acceptable replacement for the object window. Processing then passes to store replacement object window 596, where the best match window is stored as a replacement object window in a first-in-last-out arrangement. The maximum number of acceptable replacement windows retained in the first-in-last-out arrangement is preferably user selectable. Preferably, when the maximum number of acceptable replacement windows is reached the oldest acceptable replacement window is eliminated. The system then continues to last frame check 384. If the distance of the best match window is less than the replacement object threshold, the best match window is not an acceptable replacement for the object window and processing passes directly to last frame check 384.

If the best match window is found to be unacceptable in match threshold comparison 380, processing passes to display first warning 591, where the system displays a warning message that the system is attempting to replace the object window. In replacement object window available 592, the system checks to see if any acceptable replacements for the window object have been stored in the first-in-last-out arrangement. If a replacement window is available, the system will replace the object window with the most recently stored acceptable replacement window and remove that replacement window from the first-in-last-out arrangement. Processing is then returned to intensity distance calculation 360 with the replaced object window.

If no acceptable replacement window is available in the first-in-last-out arrangement, the system will display a second warning from display second warning 593. The system then awaits further commands from the user.

Figure 6:
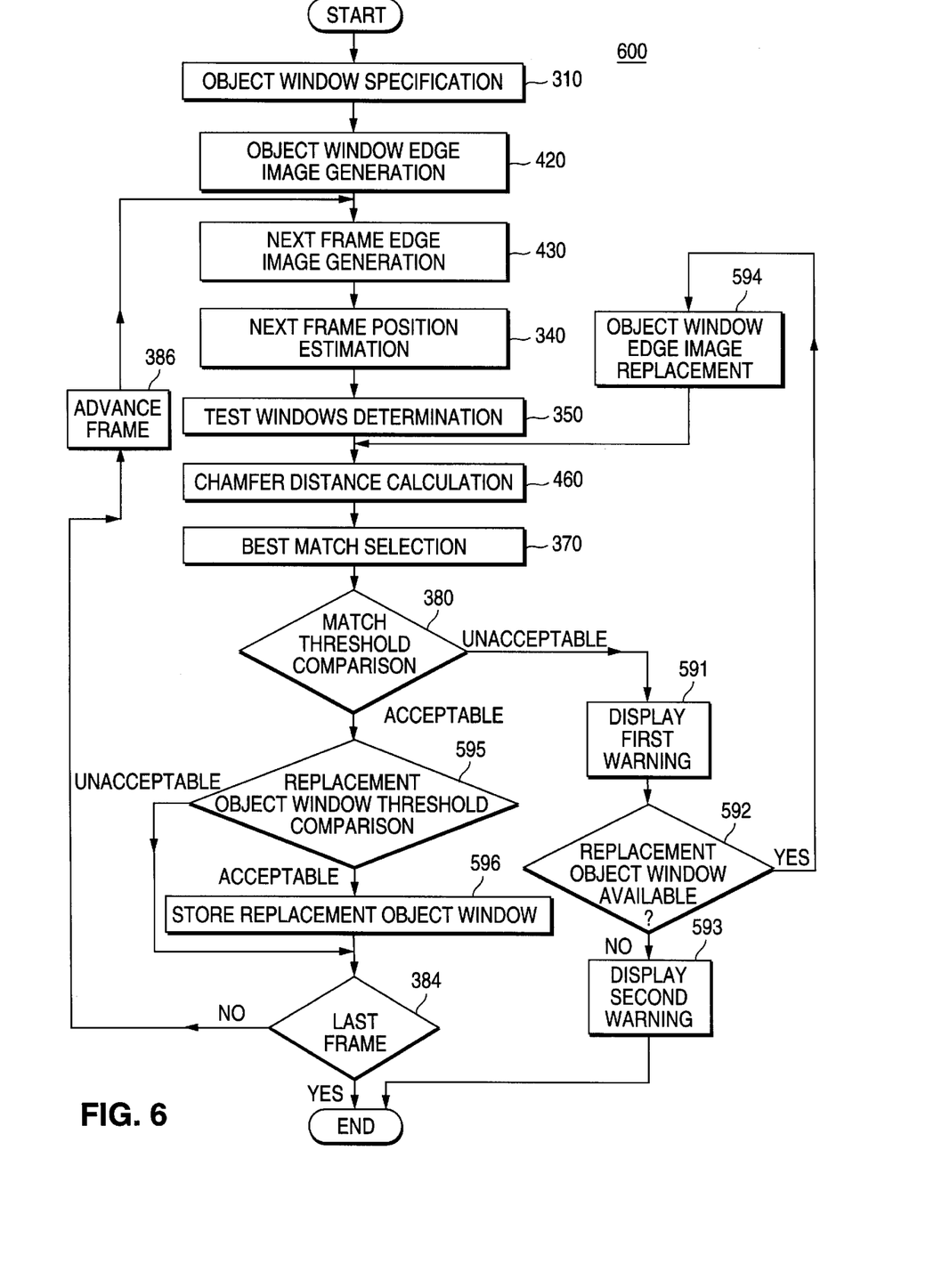
FIG. 6 shows a process flow diagram of an implementation of the object tracking system in accordance with the present invention using chamfer distance and object window replacement.

FIG. 6 shows a process flow diagram of another embodiment 600 of the invention. This embodiment is similar to that illustrated in FIG. 5. Consequently, the complete description is not repeated. Rather, only the modifications in FIG. 6 to the structures and operations in FIG. 5 are described. In this embodiment the chamfer distance between edge images is used in place of the intensity distance between intensity images. Specifically, object window intensity image generation 320 is replaced with object window edge image generation 420; next frame intensity image generation 330 is replaced with next frame edge image generation 430; and intensity distance calculation 360 is replaced with chamfer distance calculation 460. The consequence of these changes is described above with regard to FIG. 4.

The various embodiments of the structure and method of this invention that are described above are illustrative only of the principles of this invention and are not intended to limit the scope of the invention to the particular embodiments described. In view of this disclosure, those skilled-in-the-art can define other implementations of edge detection, chamfer matching, motion estimation, distance measures, GUI, matching criteria, replacement criteria, and use these alternative features to create a method or system of object tracking according to the principles of this invention.

We claim:

1. An object tracking method for automatically tracking an object in a video sequence, the object being chosen by an user, comprising:

specifying an object window enveloping said object in a first frame of said video sequence;

estimating a position of said object in a second frame of said video sequence;

determining a plurality of test windows in said second frame within a predetermined distance of said estimated position of said object;

comparing said object window with each of said test windows, comprising
   calculating a distance between said object window and each of said test windows; and
   selecting a best match window from said plurality of test windows, said best match window having a lowest distance between said object window and said test windows;

comparing said lowest distance to a predetermined match threshold;

displaying a warning if said lowest distance is greater than said predetermined match threshold;

comparing said lowest distance to a predetermined replacement threshold; and specifying a replacement object window if said lowest distance is greater than said predetermined replacement threshold and said lowest distance is less than said predetermined match threshold.

2. An object tracking method for automatically tracking an object in a video sequence, the object being chosen by an user, comprising:

specifying an object window enveloping said object in a first frame;

processing a plurality of sequential subsequent frames, each of said sequential subsequent frames having a set of previous frames, by, for each of said sequential subsequent frames, estimating a position of said object in each of said sequential subsequent frames by fitting the position of said object in each of said previous frames in a quadratic polynomial having coefficient vectors i, j, and k, approximating i, j, and k using a selected fitting method, and calculating said position of said object in said sequential subsequent frame using i, j, and k in a quadratic polynomial;

determining a plurality of test windows in each of said sequential subsequent frames within a predetermined distance of said estimated position of said object;

comparing said object window with each of said test windows in each of said sequential subsequent frames; and selecting a best match window from said plurality of test windows for each of said sequential subsequent frames.

3. An object tracking method as in claim 2, wherein said selected fitting method is a least squares fitting method.

4. An object tracking method for automatically tracking an object in a video sequence, the object being chosen by an user, comprising:

specifying an object window enveloping said object in a first frame;

processing a plurality of sequential subsequent frames by, for each of said sequential subsequent frames;

estimating a position of said object in each of said sequential subsequent frames;

determining a plurality of test windows in each of said sequential subsequent frames within a predetermined distance of said estimated position of said object;

comparing said object window with each of said test windows in each of said sequential subsequent frames, by calculating a distance between said object window and each of said test windows, and selecting a best match window from said plurality of test windows for each of said sequential subsequent frames, said best match window having a lowest distance between said object window and said test windows;

comparing said lowest distance to a predetermined match threshold;

displaying a warning if said lowest distance is greater than said predetermined match threshold;

comparing said lowest distance to a predetermined replacement threshold; and specifying a replacement object window if said lowest distance is greater than said predetermined replacement threshold and said lowest distance is less than said predetermined match threshold.

* * * * *